Jan. 19, 1965   H. G. SCHULTZ ET AL   3,166,192
THEFT-PROOF BOTTLE RACK

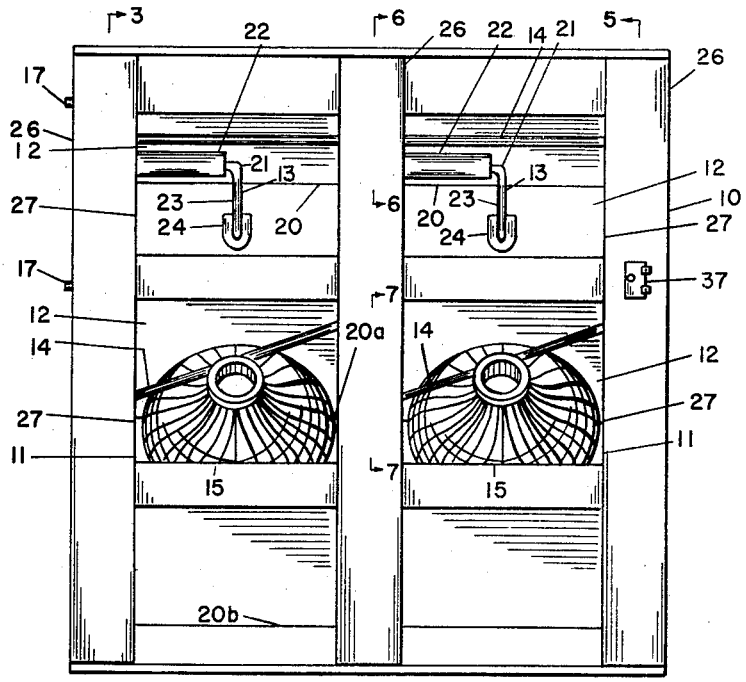
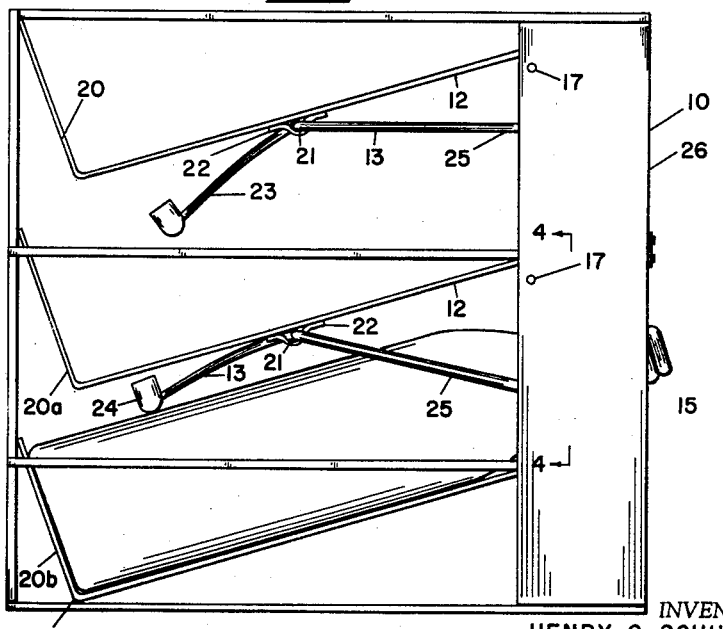

Filed Feb. 11, 1963   2 Sheets-Sheet 2

INVENTORS
HENRY G. SCHULTZ
KENTON J. KAROW
BY Joseph G. Werner

ATTORNEY

United States Patent Office 3,166,192
Patented Jan. 19, 1965

3,166,192
THEFT-PROOF BOTTLE RACK
Henry G. Schultz, De Forest, Wis., and Kenton J. Karow, Roynette, Wis.; said Karow assignor to said Schultz
Filed Feb. 11, 1963, Ser. No. 257,644
14 Claims. (Cl. 211—4)

Our invention relates to a theft-proof bottle rack.

Attractive soft drink vending machines are an integral and familiar part of the contemporary national scene. Merchants and operators of public gathering places, realizing the popularity of soft drinks, are naturally attracted to these machines as a source of supplementary income and as a means of drawing customers. Despite the advantages of outside placement of the vending machines, even though placed adjacent to the business buildings, many businessmen have been reluctant to purchase outside vending machines because pilfering of the empty soft drink bottles can substantially reduce the profit margin. For the same reason, some owners of unattended places such as golf courses, parks, laundromats and so forth, have resitated to install vending machines. An eager market awaits a bottle rack which solves the pilfering problem.

A primary object of our invention, therefore, is to provide a theft-proof bottle rack.

Another object of our invention is to provide a theft-proof bottle rack which is self-locking.

Other objects and advantages of our invention will be apparent from the following detailed description taken in conjunction with the accompanying drawings wherein a preferred embodiment of the principles of the invention has been selected for exemplification.

In the drawings:

FIG. 1 is illustrative of the front view of the theft-proof bottle rack of the invention.

FIG. 2 is a side view of the theft-proof bottle rack of FIG. 1.

Figure 3:
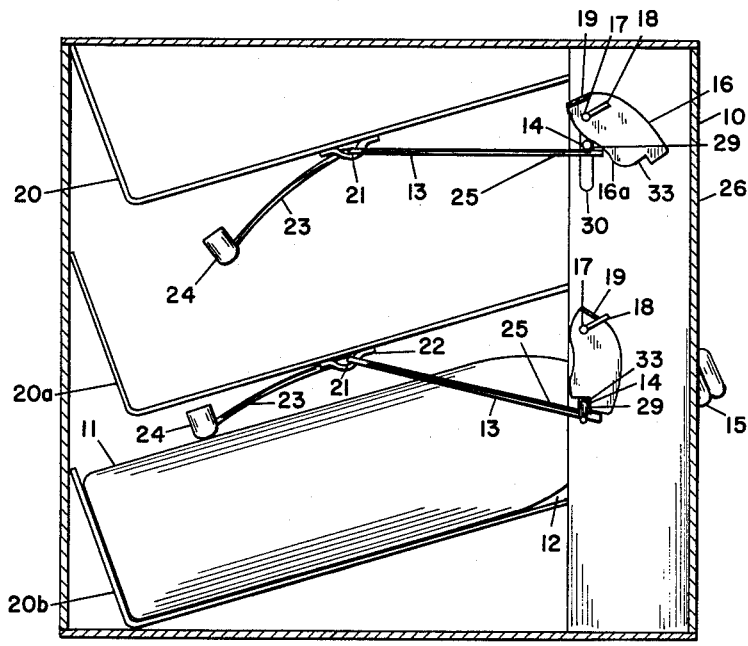
FIG. 3 is a sectional view taken along line 3—3 in FIG. 1.

The theft-proof bottle rack 10 of our invention will protect any bottle or container 11 which has a neck that is narrower than its base against theft. In brief, the insertion of the bottle 11 into a compartment 12 in the rack 10 engages an actuating means or lever 13 which trips a locking bar 14 into engagement with the narrowed neck 15 of the bottle 11, thereby locking the bottle 11 in the compartment 12. The locking bar 14 is maintained in its locking position by a pivotable latch cam 16. To disengage the latch cam 16 and the locking bar 14 to permit removal of the bottle 11, a cam shaft 17 fixedly mounting a release pin 18 is turned. The turning of the cam shaft 17 causes the release pin 18 to engage and displace a release lug 19 integrally extending from the latch cam 16. Displacement of the release lug 19 causes the latch cam 16 to pivot and disengage the locking bar 14, thereby freeing the bottle 11.

Our theft-proof bottle rack 10 may have any number of compartments 12 of any desired size, depending upon the particular type of bottle 11 for which the rack is designed. Each compartment 12 has its own individually operated locking bar 14 and associated operating structure consisting of the actuating lever 13 and the latching cam 16. For simplicity of illustration, the compartments 12 are shown in FIG. 2 as having slanted upper and lower walls provided by single piece, L-shaped members 20, 20a and 20b. Such construction allows convenient placement of the bottles, but any suitable structure may be used to define the compartments 12.

The actuating levers 13 each have a central section 21, which is pivotally secured by a housing 22 to the bottom of the particular L-shaped member 20, 20a or 20b which defines the top wall of the particular compartment 12 in which the lever is located. Each actuating lever 13 additionally has a weighted end 23 extending rearwardly and downwardly from the central section 21 into compartment 12, as shown in FIG. 2, and a tripping end 25 extending forwardly from the central section 21 into the interior of one of the vertical channel members 26 which define the opening 27 through which the bottle 11 is inserted into the compartment 12. The actuator lever weighted end 23 preferably carries a counter weight 24, as shown.

Figure 4:
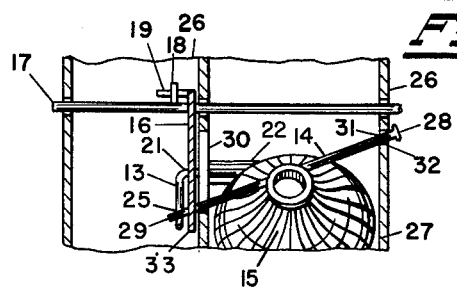
FIG. 4 is a partial sectional view taken along line 4—4 in FIG. 2.

As best viewed in FIG. 4, the locking bars 14 each have a fixed end 28 pivotally secured in a wall of a channel member 26 forming one side wall of the opening 27, and a movable end 29 constrained to move in a substantially vertical slot 30 in the opposite wall of the channel member 26 forming the other side wall of the opening 27. One suitable method of pivotally mounting the fixed end 28 of the locking bar 14 is to seat a portion 31 of reduced diameter in a groove 32 in the channel member 26, as shown in FIG. 4. While the locking bar 14 is shown as a simple straight bar, it may, if desired, be shaped to conform to the neck of the bottle 11 to be locked.

The latch cams 16 are pivotally mounted on the cam shafts 17, which are rotatably secured in transverse relation to the channel members 26. One cam shaft 17 controls all the cams 16 in one row of compartments 12 in the rack 10. The cams 16 are mounted within the channel members 26 to pivot from an upper position free and clear of the slot 30, as shown by the upper cam 16 in FIG. 3, to a position engaging the locking bar 14 in locking relation, as shown by the lower cam 16 in FIG. 3. The release lug 19 extends outwardly from the top of the cam 16 into the interior of the channel member 26 for engagement with the release pin 18 rigidly secured to the cam shaft 17. The latch cam 16 has a notch 33 which engages the movable end 29 of the locking bar 14 in locking relation when the cam 16 is in its locking position. The cams 16 are retained in the position illustrated by the upper cam in FIG. 3, when the adjacent compartment 12 is empty, by the locking bars 14, which bear upon the inner edges 16a of the cams in supporting relation.

Preferably, the latch cam 16 and the entire tripping end 25 of the actuating lever 13 are totally enclosed by the channel members 26 to prevent any tampering with the rack 10 by unauthorized persons. In order to more clearly show the structure of my theft-proof rack 10, however, the channel members 26 shown in the drawings enclose only the outer portion of the tripping end 25.

Figure 5:
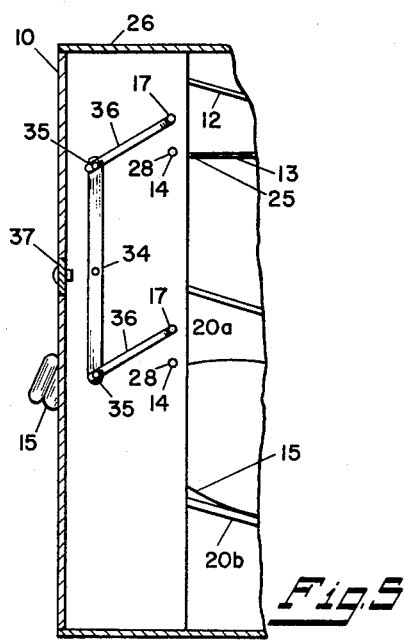
FIG. 5 is a partial sectional view taken along line 5—5 in FIG. 1.

It is desirable that all of the cam shafts 17 be rotatable as a unit to simultaneously unlock all of the locking bars 14 when the owner of the theft-proof rack 10 wishes to remove the bottles 11. One convenient way of accomplishing this is illustrated in FIG. 5. All of the cam shafts 17 are connected to a common arm 34 by means of connecting rods 36, extending rigidly from the cam shafts 17 and being rotatably joined to common arm 34 by pins 35 or other suitable fastener means. The common arm 34, like the cam 16 and the tripping end 25 of the actuating lever 13, is preferably safely enclosed by one of the outer channel members 26 to prevent manipulation of the arm 34 by unauthorized persons. The channel member 26 housing the common arm 34 has a normally locked door 37 which may be unlocked and opened by the owner of the rack 10 to expose the common arm 34 for actuation. If desired, conventional means may be incorporated to prevent the door 37 from being locked, or the key which locks the door from being removed, until the common arm 34 has rotated the cam shafts 17 to reset the latching cams 16 for the self-locking operation of the rack 10.

The detailed operation of the self-locking bottle rack may best be described with reference to FIG. 3. The cam shafts 17 are rotated to a position which permits, except for the support of the locking bars 14 against the cam inner edges 16a, the latching cams 16 to pivot to their lower positions to engage the locking bars 14 in locked relation. When a compartment 12 is empty, the counter weight 24 at the tip of the weighted end 23 of the actuating lever 13 biases the tripping end 25 into engagement with the movable end 29 of the locking bar 14 to support the locking bar 14 in a substantially horizontal position. The locking bar, in turn, supports the latching cam 16 in its upper position, as illustrated by the upper cam 16 in FIG. 3 and as previously described. The substantially horizontal position of the locking bars 14, illustrated by the upper locking bars in FIGS. 1 and 3, allows a bottle 11 to be inserted into each of the adjacent compartments 12. As a bottle 11 enters an empty compartment 12, the base of the bottle strikes the weighted end 23 of the actuating lever 13, causing its weighted end 23 to be pivoted upward and its tripping end 25 to be pivoted downward. As the tripping end 25 pivots to its downward position, the movable end 29 of the locking bar 14 drops to the bottom of the slot 30, thereby permitting the latch cam 16 to pivot upon cam shaft 17 to its locking position, whereby the locking bar 14 is engaged by the cam notch 33 in locked relation, as shown by the lower cam 16 in FIG. 3.

If a pilferer attempts to remove a bottle 11 when the locking bar 14 is in the described locked position, the latch cam 16 prevents the movable end 29 of the locking bar 14 from sliding up the slot 30 to the horizontal or open position, and the bottle 11 is retained in the compartment 12 by the locking bar 14. The movable end 29 of the locking bar 14 preferably has a square shape, as shown in FIG. 3, which keeps the bar 14 from rotating within the slot 30.

Figure 6:
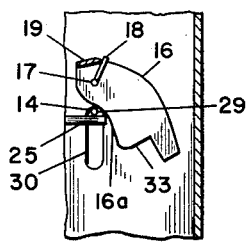
FIG. 6 is a partial sectional view taken along line 6—6 in FIG. 1 showing the position of a latch cam immediately after the removal of a bottle from the compartment with which it is associated.
Figure 7:
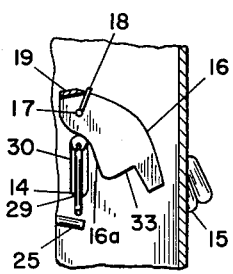
FIG. 7 is a partial sectional view taken along line 7—7 in FIG. 1 showing the position of a latch cam immediately preceding the removal of a bottle from the compartment with which it is associated.

The owner of the self-locking rack 10 of our invention may remove the locked bottles 11 by simply moving the common arm 34 upward. Such movement causes rotation of the cam shafts 17, which in turn causes the release pins 18 rigidly connected to the cam shaft 17 to engage the adjacent latch cam release lugs 19 and pivot the latch cams 16 about the cam shafts 17 to disengage the release bars 14. This position of a latch cam 16 is shown in FIG. 7. Once the locking bars 14 are disengaged from the latch cams 16, the bottles 11 may be easily removed. The initial movement of the bottle 11 out of the compartment 12 releases the counter weight 24 to again raise the locking bar 14, by means of the actuator lever tripping end 25, to the open position. When the locking bar 14 reaches the open position, nothing hinders the final movement of the bottle 11 out of the compartment 12. The relative positions of the locking bar 14, the tripping end 25 and the latch cam 16 immediately after the removal of the bottle 11 is as shown in FIG. 6. After all the empty bottles are removed, the rack 10 is reset for self-locking by pulling the common arm 34 downward to rotate the cam shafts 17. The rotation of the cam shafts 17 by the downward movement of the common arm 34 disengages the release pins 18 from the release lugs 19 to allow the latching cams 16 to drop to the position in which they are supported by the locking bars 14. This is the position illustrated by the upper latch cam 16 in FIG. 3.

The embodiment of our theft-proof bottle rack 10 illustrated in the drawings is designed to be vertically mounted on the side of a vending machine, or any other stationary object, from which the whole rack 10 may not be removed without considerable labor. While the gravity biasing of the tripping end 25 of the actuating lever 13 with the counter weight 24 is rendered inoperative if the rack 10 is placed with the openings 27 in a horizontal plane, the rack 10 may be easily adapted for horizontal placement by substituting spring biasing for the illustrated gravity biasing. More explicitly, in horizontally placed racks a spring biases the tripping end 25 of the actuating lever 13 to support the locking bar 14 in the open position and the latching cam 16 in the position free of the slot 30.

The tip of the tripping end 25 is attached by any convenient means to the movable end 29 of the locking bar 14. By such attachment movement of the tripping end 25 controls the movement of the locking bar 14.

Insertion of a bottle 11 into a spring biased rack 10 trips the spring and the tripping end 25 to move the locking bar 14 to the locking position in the same manner previously described for the gravity biased rack 10. The operation of the cam shafts 17 and the common arm 34 is identical for either the vertical or horizontal positions.

Our theft-proof bottle rack 10 is not limited to any particular construction nor to any particular method of mounting or placing the locking structure in the rack. A given size bottle compartment 12 will accommodate different bottles of widely varying size and shape. The invention includes in its broad scope any suitable means of adapting the locking bar 14 and its associated operating structure to any variety of rack.

Almost all parties involved in the soft drink industry, an industry which is a leading customer for a theft-proof bottle rack, may expect to benefit from our invention. Manufacturers of vending machines benefit because merchants are no longer hesitant to install outdoor vending machines. This would open a large new market. Glass manufacturers would benefit because more beverages would be sold and, therefore, more bottles would be needed. The soft drink manufacturers benefit because they can more easily sell the vending machines to merchants and operators of public gathering places. The merchants gain through increased sales and because all profit loss due to the pilfering of empty bottles is ended. In addition, the use of our theft-proof rack 10 permits the unattended, twenty-four hour vending of liquids, and will draw people to the place of business near the location of the vending machine. Merchants who have previously refused to buy and/or install vending machines can now profit from the machines' business attracting features. Use of our theft-proof rack will also substantially reduce bottle breakage due to handling, and will eliminate the necessity for several conventional storage cases. The theft-proof rack 10 is not, of course, limited to the storage of soft drink bottles. It may very advantageously be employed to lock the full bottles of milk delivered by a milk man and the empty bottles left for him to collect. Broadly, our invention may be used to secured from theft any container with a neck of smaller diameter than the widest portion of the bottle.

Racks and vending machines are now usually placed inside stores or other building because of the pilfering problem. Because of the theft-proof construction of our rack, a vending machine accompanied by our rack may be placed outside where it attracts more customers and more sales. The life of the bottles is considerably extended because of the loss of those stolen bottles which are destroyed is ended. Our rack will also eliminate the need for legislation prohibiting outdoor vending machines which has been considered by municipalities to reduce littering of streets and public places with broken or discarded bottles. Storekeepers can place the racks on the outside of building walls for the reception of milk, soda and other bottles, thereby saving much space inside the store. By eliminating one of the temptations to steal bottles, most of which are redeemable for cash, my theft-proof rack strengthens the moral fiber of youth. Since its construction is compact, our theft-proof bottle rack holds as many bottles as does the vending machine in a relatively small area. The rack can therefor easily be hung on one side of a vending machine.

It is understood that our invention is not confined to the particular construction and arrangement of parts herein illustrated and described, but embraces all such modified forms thereof as come within the scope of the following claims.

We claim:

1. A self-locking bottle compartment having an opening for insertion of a bottle, a locking bar adapted to be positioned in an open position permitting the insertion of a bottle through said opening and into said compartment and in a locking position wherein said locking bar extends across said opening to prevent the removal of a bottle from said compartment, actuating means for engaging said locking bar to hold it in said open position when said compartment is empty and for releasing said locking bar to permit it to move to said locking position when a bottle is inserted through said opening into said compartment, and means to secure said locking bar in said locking position.

2. The self-locking bottle compartment of claim 1 which includes means for releasing the locking bar from the locking position for removal of a bottle placed in said compartment.

3. The self-locking bottle compartment of claim 2 which includes means for resetting the actuating means for actuation by the insertion of a bottle after said compartment has been emptied.

4. The self-locking bottle compartment of claim 1 which includes means for enclosing the actuating means and the securing means whereby to prevent tampering therewith by unauthorized persons.

5. The self-locking bottle compartment of claim 2 which includes means for enclosing the actuating means, the securing means and the means to release the locking bar from the locking position whereby to prevent tampering therewith by unauthorized persons.

6. A self-locking bottle compartment having an opening for insertion of a bottle, a locking bar adapted to be positioned in an open position permitting the insertion of a bottle through said opening and into said compartment and in a locking position wherein said locking bar extends across said opening to prevent the removal of a bottle from said compartment, an actuating lever with a weighted end and a tripping end, said actuating lever being pivotally attached to said compartment, said tripping end being adapted to engage said locking bar, said weighted end biasing said tripping end into engagement with said locking bar to hold it in said open position when said compartment is empty, said actuating lever being pivoted by the insertion of a bottle through said opening into said compartment whereby to trip said locking bar to said locking position, and means to secure said locking bar in said locking position.

7. A self-locking bottle compartment having a first side wall and a second side wall, said side walls defining an opening for insertion of a bottle, a locking bar having a fixed end and a movable end, said fixed end being pivotally attached to said first side wall and said movable end being constrained to move in a substantially vertical slot in said second side wall, a latch cam pivotally movable relative to said second wall, said movable end of said locking bar being adapted to follow said latch cam, an actuating lever with a weighted end and a tripping end, said actuating lever being pivotally attached to said compartment, said tripping end being adapted to engage said movable end of said locking bar, said weighted end biasing said tripping end into engagement with said movable end of said locking bar to hold it near the upper end of said slot and to hold said latch cam in position when said compartment is empty, said actuating lever being adapted to pivot when a bottle is inserted through said opening into said compartment thereby to trip said movable end of said locking bar to the lower end of said slot and to permit said latch cam to move to a locking position maintaining said movable end of said locking bar at the lower end of said slot and preventing said bottle from being withdrawn from said compartment, and means for disengaging said latch cam from said locking bar to permit said movable end of said locking bar to be moved upward from the lower end of said slot and allow said bottle to be withdrawn from said compartment.

8. A self-locking bottle compartment having a first side wall and a second side wall, said side walls defining an opening for insertion of a bottle, a locking bar having a fixed end and a movable end, said fixed end being pivotally attached to said first side wall and said movable end being constrained to move in a substantially vertical slot in said second side wall, a cam shaft extending between said side walls in rotatable relation thereto, a latch cam pivotally mounted on said cam shaft adjacent said second side wall, said movable end of said locking bar being adapted to follow said latch cam, an actuating lever with a weighted end and a tripping end, said actuating lever being pivotally attached to said compartment, said tripping end being adapted to engage said movable end of said locking bar, said weighted end biasing said tripping end into engagement with said movable end of said locking bar to hold it near the upper end of said slot and to hold said latch cam in position when said compartment is empty, said actuating lever being adapted to pivot when a bottle is inserted through said opening into said compartment thereby to trip said movable end of said locking bar to the lower end of said slot and to permit said latch cam to rotate to a locking position maintaining said movable end of said locking bar at the lower end of said slot and preventing said bottle from being withdrawn from said compartment, said lock cam having a release lug, said cam shaft having a release pin adapted to engage said lug, and means for rotating said cam shaft thereby to cause said release pin to engage said lug and rotate said latch cam to permit said movable end of said locking bar to be moved upward from the lower end of said slot and allow said bottle to be withdrawn from said compartment.

9. A theft-proof bottle rack comprising a plurality of columns and rows of the compartments of claim 7.

10. The theft-proof bottle rack of claim 8 in which all the compartments in any one of the rows share the same cam shaft, and which includes means to rotate all of the cam shafts simultaneously.

11. The theft-proof bottle rack of claim 8 in which all of the compartments in any one of the rows share the same cam shaft, said cam shafts each having a connecting rod rigidly affixed thereto, said connecting rods being tied together by a common arm rotatably joined to each of said connecting rods whereby all of said cam shafts are simultaneously rotated when said common arm is moved.

12. The self-locking bottle compartment of claim 7 in which the movable end of the locking bar which moves in the substantially vertical slot is approximately square in cross-section.

13. A theft-proof bottle rack comprising a plurality of columns and rows of self-locking bottle compartments, each of said compartments having a first side channel member with inner and outer walls and a second side channel member with inner and outer walls, the inner walls of said side channel members defining an opening for insertion of a bottle, a locking bar having a fixed end and a movable end, said fixed end being pivotally attached to said inner wall of said first side channel member and said movable end being constrained to move in a substantially vertical slot in said inner wall of said second side channel member, a cam shaft spaced vertically above said locking bar and transversely extending between said side channel members, a latch cam pivotally mounted on said cam shaft within said second side channel member, said movable end of said locking bar being adapted to follow said latch cam, an actuating lever with a weighted end and a tripping end, said actuating lever being pivotally attached to said compartment, said tripping end extending within said second side channel member to engage said movable end of said locking bar, said weighted end extending into said compartment, said weighted end biasing said tripping end into engagement with said movable end of said locking bar to hold it near the upper end of said slot and to hold said latch cam in position when said compartment is empty, said actuating lever being adapted to pivot when a bottle is inserted through said opening into said compartment thereby to trip said movable end of said locking bar to the lower end of said slot and to permit said latch cam to rotate to a locking position maintaining said movable end of said locking bar at the lower end of said slot and preventing said bottle from being withdrawn from said compartment, said latch cam having a release lug, said cam shaft having a release pin adapted to engage said lug, means for rotating said cam shaft thereby to cause said release pin to engage said lug and rotate said latch cam to permit said movable end of said locking bar to be moved upward from the lower end of said slot and allow said bottle to be withdrawn from said compartment, and means to reset said latch cam for further self-locking of said compartment after the removal of bottle from said compartment.

14. A self-locking bottle compartment having an opening for insertion of a bottle, a locking bar adapted to be positioned in an open position permitting the insertion of a bottle through said opening and into said compartment and in a locking position wherein said locking bar extends across said opening to prevent the removal of a bottle from said compartment, an actuating lever having a tripping end, said actuating lever being pivotally attached to said compartment, said tripping end being adapted to engage said locking bar, means for biasing said tripping end into engagement with said locking bar to hold it in said open position when said compartment is empty, said actuating lever being pivoted by the insertion of a bottle through said opening into said compartment whereby to trip said locking bar to said locking position, and means to secure said locking bar in said locking position.

References Cited by the Examiner
UNITED STATES PATENTS

| | | | |
|---|---|---|---|
| 542,736 | 7/95 | Jordan et al. | 21—9 X |
| 2,208,483 | 7/40 | Wallace | 232—41.5 |
| 2,316,897 | 4/43 | Smith | 221—102 X |

CLAUDE A. LE ROY, *Primary Examiner.*